(12) United States Patent
Fujibayashi et al.

(10) Patent No.: US 8,034,883 B2
(45) Date of Patent: Oct. 11, 2011

(54) POWDERED RESIN COMPOSITION FOR SLUSH MOLDING AND MOLDED PRODUCT

(75) Inventors: Shinya Fujibayashi, Ohtsu (JP); Shogo Nishioka, Matsudo (JP); Daichi Maruyama, Misato-cho (JP); Akira Nomura, Jinnaka-cho (JP)

(73) Assignees: Sanyo Chemical Industries, Ltd., Kyoto (JP); Toyota Jidosha Kabushiki Kaisha, Aichi (JP)

( * ) Notice: Subject to any disclaimer, the term of this patent is extended or adjusted under 35 U.S.C. 154(b) by 61 days.

(21) Appl. No.: 10/594,779

(22) PCT Filed: Mar. 14, 2005

(86) PCT No.: PCT/JP2005/004423
§ 371 (c)(1),
(2), (4) Date: Jul. 12, 2007

(87) PCT Pub. No.: WO2005/097901
PCT Pub. Date: Oct. 20, 2005

(65) Prior Publication Data
US 2007/0287793 A1  Dec. 13, 2007

(30) Foreign Application Priority Data
Mar. 31, 2004 (JP) ................................ 2004-105101

(51) Int. Cl.
C08L 75/04 (2006.01)
(52) U.S. Cl. ........................................ 525/455; 525/123
(58) Field of Classification Search .................... 525/130
See application file for complete search history.

(56) References Cited

U.S. PATENT DOCUMENTS

| | | | | |
|---|---|---|---|---|
| 3,962,370 A | * | 6/1976 | Hutchinson | 525/126 |
| 4,022,849 A | * | 5/1977 | Jin et al. | 524/533 |
| 4,223,114 A | * | 9/1980 | Suling et al. | 525/440.07 |
| 4,233,424 A | * | 11/1980 | Suling et al. | 525/440.05 |
| 4,686,138 A | * | 8/1987 | Toyama et al. | 428/323 |
| 5,212,273 A | * | 5/1993 | Das et al. | 526/323.1 |
| 5,567,563 A | * | 10/1996 | Minami | 430/108.4 |
| 5,714,261 A | * | 2/1998 | Siol et al. | 428/402 |
| 5,906,704 A | * | 5/1999 | Matsuura et al. | 156/331.4 |
| 5,958,658 A | * | 9/1999 | Smith et al. | 430/533 |
| 6,177,508 B1 | * | 1/2001 | Ohmori et al. | 524/590 |
| 6,224,970 B1 | * | 5/2001 | Hiroyuki et al. | 428/327 |
| 6,296,903 B1 | * | 10/2001 | Sapper et al. | 427/195 |
| 6,872,768 B1 | * | 3/2005 | Tasaka et al. | 524/474 |
| 7,005,480 B2 | * | 2/2006 | Kinsho et al. | 525/390 |
| 2003/0098114 A1 | * | 5/2003 | Samurkas et al. | 156/108 |
| 2003/0125479 A1 | * | 7/2003 | Kinsho et al. | 525/403 |

FOREIGN PATENT DOCUMENTS

| | | |
|---|---|---|
| JP | 02-038453 | 2/1990 |
| JP | 04-359045 | 12/1992 |
| JP | 06-306248 | 11/1994 |
| JP | 10-077403 | 3/1998 |
| JP | 2000-017033 | 1/2000 |
| JP | 2000-351850 | 12/2000 |
| JP | 2002-088210 | 3/2002 |
| JP | 2003-119343 A | 4/2003 |
| JP | 2003-213121 | 7/2003 |
| JP | 2005-126534 A | 5/2005 |

OTHER PUBLICATIONS

Patnaik, Pradyot (2003). Handbook of Inorganic Chemicals. (pp. 822-826). McGraw-Hill.☐☐Online version available at:☐☐http://knovel.com/web/portal/browse/display?_EXT_KNOVEL_DISPLAY_bookid=688&VerticalID=0.*
Translation of Kanetani et al JP 02038453.*

* cited by examiner

Primary Examiner — Randy Gulakowski
Assistant Examiner — Mike M Dollinger
(74) Attorney, Agent, or Firm — Sughrue Mion, PLLC

(57) ABSTRACT

A powdered resin composition for slush molding comprising a thermoplastic polyurethane resin powder (B) as the main component and a fine particle powder (A) of a vinyl type copolymer comprising a copolymer of a monomer (a01) having one vinyl group such as methyl methacrylate and a monomer (a02) having two or more vinyl groups such as ethylene glycol dimethacrylate and having a cross-linked structure; or a fine particle powder (E) of a vinyl type copolymer comprising the (a01) and a monomer (a03) having one or more vinyl groups and one or more functional groups other than a vinyl group such as hydroxyethyl (meth)acrylate and having a cross-linked structure. The fine particle powder is a powder flowability improver which does not cause die stains and the powdered resin composition for slush molding containing the fine powder do not cause staining of molds.

6 Claims, No Drawings

US 8,034,883 B2

POWDERED RESIN COMPOSITION FOR SLUSH MOLDING AND MOLDED PRODUCT

CROSS-REFERENCE TO RELATED APPLICATION(S)

This application is a §371 application of copending international patent application PCT/JP2005/004423 which was filed on Mar. 14, 2005, and which claims priority to Japanese Patent Application Serial No. 2004-105101 which was filed on Mar. 31, 2004, both of which are incorporated by reference.

TECHNICAL FIELD

The invention relates to a powdered resin composition for slush molding comprising a thermoplastic polyurethane type resin powder as the main component and suitable for a molding material for automotive interior parts such as instrument panels and door trim.

BACKGROUND ART

Conventionally, a slush molding product of vinyl chloride type resin powder has been used as a skin material for automotive interior parts such as instrument panels and door trim.

The vinyl chloride type material, however, deteriorates in softness during a long time use since the plasticizer contained therein moves toward the surface during a long time use, depending on the use environments. Further, at the time of incineration processing after a used car is disposed, hydrogen chloride gas may be generated depending on the incineration temperature and may cause corrosion of an incinerator in some cases.

To solve these problems, development of a powder slush molding material mainly containing a thermoplastic polyurethane resin powder has been promoted. The powder slush molding method is a method for molding a skin material by filling a die heated to 200 to 300° C. with a powder, rotating the die for depositing the powder to the inner face of the die, discharging the un-deposited powder out of the die, and recovering the powder.

However, the thermoplastic polyurethane resin powder for slush molding causes blocking with the lapse of time when it is left as it is and is deteriorated in the powder flowability. To improve these phenomena, it has been tried to add a maleimide copolymer fine particle powder or a thermoplastic resin powder which is not thermally melted at 160° C. or lower as a powder flowability improver (e.g. reference to Patent Document No. 1 and Patent Document No. 2).

Patent Document No. 1: Japanese Patent Application Laid-Open (JP-A) No. 10-77403
Patent Document No. 2: JP-A No. 2000-17033

DISCLOSURE OF THE INVENTION

Problems to be Solved by the Invention

However, the above-mentioned powder flowability improver stains a die and due to that, the mold release resistance becomes high and the luster of the obtained skin face is increased or changed to deteriorate the appearance.

The purpose of the invention is to find a powder flowability improver which does not cause die stains.

Means to Solve the Problems

The inventors made studies of solution to this problem, accordingly have found that if a vinyl type copolymer fine particle powder having a cross-linked structure is added to a thermoplastic polyurethane type resin powder composition, no stain of a die is caused and blocking is prevented and based the findings, the inventors of the invention have accomplished the invention.

That is, the invention provides a powdered resin composition for slush molding comprising a thermoplastic polyurethane resin powder (B) as the main component and a fine particle powder (A) of a vinyl type copolymer comprising a copolymer of a monomer (a01) having one vinyl group and a monomer (a02) having two or more vinyl groups and having a cross-linked structure (first invention);

a powdered resin composition for slush molding comprising a thermoplastic polyurethane resin powder (B) as the main component and a fine particle powder (E) of a vinyl type copolymer comprising a copolymer of a monomer (a01) having one vinyl group and a monomer (a03) having one or more vinyl groups and one or more functional groups other than a vinyl group and having a cross-linked structure (second invention); and a urethane resin molded product produced from the powdered resin composition.

Effects of the Invention

The powdered resin composition of the invention containing a fine particle powder of a vinyl type copolymer having a cross-linked structure is excellent in the powder flowability and the storage stability and in the case it is used for slush molding, it is effective to prevent stains of a die without deteriorating the melting property of the composition at the time of molding and avoid deterioration of the molding property and quality decrease of the molded skin at the time of continuous molding.

BEST MODE FOR CARRYING OUT THE INVENTION

Hereinafter, the first invention will be described.

A resin (a0) of a fine particle powder (A) of a vinyl type copolymer having a cross-linked structure to be used in the invention comprises a monomer (a01) having one vinyl group and a monomer (a02) having two or more vinyl groups copolymerizable with the above-mentioned monomer (a01) as essential components. In the invention, the monomer (a01) having one vinyl group means a monomer having one carbon-carbon double bond in a molecule and such a monomer may be called as a bifunctional vinyl type monomer. Also, the monomer (a02) having two or more vinyl groups means a monomer having two or more carbon-carbon double bonds in a molecule and such a monomer may be called as tetra or higher-functional vinyl monomer. In the invention (the first invention and the second invention), the term "functional" means the number of latent bonds which one compound shows at the time of polymer compound production. Also, vinyl group may be included in a broad definition and defined as a group having one carbon-carbon double bond. Being made apparent from the definition, the vinyl group is bifunctional since it has two latent bonds at the time of producing a polymer compound.

Specific examples of the monomer (a01) having one vinyl group (a bifunctional vinyl type monomer) may include:
(a) vinyl type hydrocarbons
　(a1) aliphatic vinyl type hydrocarbons: ethylene, propylene, butene, isobutylene, pentene, heptene, diisobutylene, octene, dodecene, octadecene, α-olefines other than the examples listed above, and the like,
　(a2) alicyclic vinyl type hydrocarbons: cyclohexene, pinene, and the like, and (a3) aromatic vinyl type hydrocarbons: styrene, α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, vinylnaphthalene, and the like;

(b) carboxyl-containing vinyl type monomers and their salts carboxyl-containing vinyl monomers such as (meth)acrylic acid, maleic acid (anhydride), maleic acid monoalkyl ester, fumaric acid, fumaric acid monoalkyl ester, crotonic acid, itaconic acid, itaconic acid monoalkyl ester, itaconic acid glycol monoether, citraconic acid, citraconic acid monoalkyl ester, and cinnamic acid; as well as alkali metal salts (e.g. sodium salts and potassium salts), alkaline earth metal salts (e.g. calcium salts and magnesium salts), amine salts, ammonium salts of them, and the like;

(c) sulfonic group-containing vinyl type monomers, vinyl type sulfuric acid monoester compounds, and their salts vinylsulfonic acid (salts), (meth)allylsulfonic acid (salts), methylvinyl sulfonate, styrenesulfonic acid (salts), α-methylstyrenesulfonic acid (salts), sulfopropyl (meth)acrylate, 2-hydroxy-3-(meth)acryloxypropylsulfonic acid (salts), 2-(meth)acryloylamino-2,2-dimethylethanesulfonic acid (salts), 2-(meth)acryloyloxyethanesulfonic acid (salts), 3-(meth)acryloyloxy-2-hydroxypropanesulfonic acid (salts), 2-(meth)acrylamido-2-methylpropanesulfonic acid (salts), 3-(meth)acrylamido-2-hydroxypropanesulfonic acid (salts), alkyl (3 to 18 carbon atoms) allylsulfosuccinic acid (salts), poly(n=2 to 30)oxyalkylene (e.g. ethylene, propylene, butylene: optionally homo-, random-, or block-) mono(meth)acrylate sulfuric acid ester compounds (salts) [e.g. poly(n=5 to 15)oxypropylene monomethacrylate sulfuric acid ester compounds (salts) and the like], polyoxyethylene polycyclic phenyl ether sulfuric acid ester (salts) [the above-mentioned salts may include alkali metal salts (sodium salts, potassium salts, and the like), alkaline earth metal salts (calcium salts, magnesium salts, and the like), amine salts, and ammonium salts];

(d) phosphoric acid group-containing vinyl type monomers (meth)acrylic acid hydroxyalkyl phosphoric acid monoester such as 2-hydroxyethyl (meth)acryloyl phosphate, phenyl-2-acryloyloxyethyl phosphate; (meth) acrylic acid alkyl phosphonic acids such as 2-acryloyloxyethyl phosphonic acid (salts)

(e) hydroxyl-containing vinyl type monomers hydroxystyrene, N-methylol(meth)acrylamide, hydroxyethyl (meth)acrylate, hydroxypropyl (meth)acrylate, polyethylene glycol mono(meth)acrylate, (meth)allyl alcohol, crotyl alcohol, isocrotyl alcohol, 1-buten-3-ol, 2-buten-1-ol, 2-butene-1,4-diol, propargyl alcohol, 2-hydroxyethyl propenyl ether, sucrose allyl ether, and the like;

(f) nitrogen-containing vinyl monomers (f1) amino group-containing vinyl type monomers: aminoethyl (meth)acrylate, dimethylaminoethyl (meth)acrylate, diethylaminoethyl (meth)acrylate, tert-butylaminoethyl (meth)acrylate, N-aminoethyl (meth)acrylamide, (meth)allylamine, morpholinoethyl (meth)acrylate, 4-vinylpyridine, 2-vinylpyridine, crotylamine, N,N-dimethylaminostyrene, methyl-α-acetaminoacrylate, vinylimidazole, N-vinylpyrrole, N-vinylthiopyrrolidone, N-arylphenylenediamine, aminocarbazole, aminothiazole, aminoindole, aminopyrrole, aminoimidazole, aminomercaptothiazole, their salts, and the like;

(f2) amido group-containing vinyl type monomers: (meth)acrylamide, N-methyl(meth)acrylamide, N-butylacrylamide, dieacetone acrylamide, N-methylol(meth)acrylamide, cinnamic acid amide, N,N-dimethylacrylamide, N,N-dibenzylacrylamide, methacrylformamide, N-methyl-N-vinylacetamide, N-vinylpyrrolidone, and the like;

(f3) nitryl-containing vinyl type monomers: (meth)acrylonitrile, cyanostyrene and the like;

(f4) quaternary ammonium cation-containing vinyl monomers: dimethylaminoethyl (meth)acrylate, diethylaminoethyl (meth)acrylate, diemethylaminoethyl (meth)acrylamide, diethylaminoethyl (meth)acrylamide, quaternarized compounds (quaternarized by using quaternarization agents such as methylchloride, dimethylsulfuric acid, benzyl chloride, and dimethyl carbonate) of tertiary amino group-containing vinyl monomers such as diallylamine, and the like; and (f5) nitro group-containing vinyl monomers: nitrostyrene and the like;

(g) epoxy group-containing vinyl monomers glycidyl (meth)acrylate, tetrahydrofurfuryl (meth)acrylate, p-vinylphenylphenyl oxide, and the like;

(h) halogen-containing vinyl monomers vinyl chloride, vinyl bromide, vinylidene chloride, acryl chloride, chlorostyrene, bromostyrene, dichlorostyrene, chloromethylstyrene, tetrafluorostyrene, chloroprene, and the like;

(i) vinyl esters, vinyl ethers, and vinyl ketones vinyl acetate, vinyl butyrate, vinyl propionate, vinyl butyrate, isopropenyl acetate, methyl 4-vinylbenzoate, cyclohexyl (meth)acrylate, benzyl (meth)acrylate, phenyl (meth)acrylate, vinyl methoxyacetate, vinyl benzoate, vinyl methyl ether, vinyl ethyl ether, vinyl propyl ether, vinyl butyl ether, vinyl 2-ethylhexyl ether, vinyl phenyl ether, vinyl 2-methoxyethyl ether, vinyl 2-butyoxyethyl ether, 3,4-dihydro-1,2-pyrane, 2-butoxy-2'-vinyloxydiethyl ether, vinyl 2-ethylmercaptoethyl ether, vinyl methyl ketone, vinyl ethyl ketone, vinyl phenyl ketone, p-vinyldiphenyl sulfide, vinyl ethyl sulfide, vinyl ethyl sulfone, dialkyl fumarate (two alkyl groups are linear, branched, or alicyclic groups having 2 to 8 carbon atoms), dialkyl maleate (two alkyl groups are linear, branched, or alicyclic groups having 2 to 8 carbon atoms), and the like;

(j) alkyl (meth)acrylates alkyl (meth)acrylates having alkyl of 1 to 50 carbon atoms such as methyl (meth)acrylate, ethyl (meth)acrylate, propyl (meth)acrylate, butyl (meth)acrylate, 2-ethylhexyl (meth)acrylate, dodecyl (meth)acrylate, hexadecyl (meth)acrylate, heptadecyl (meth)acrylate, eicosyl (meth)acrylate, and the like;

(k) vinyl monomers having polyalkylene glycol chains polyethylene glycol (molecular weight 300) mono(meth)acrylate, polypropylene glycol (molecular weight 500) monoacrylate, methyl alcohol ethylene oxide 10 mole adduct (meth)acrylate, lauryl alcohol ethylene oxide 30 mole adduct (meth)acrylate, and the like;

(l) other vinyl monomers acetoxystyrene, phenoxystyrene, ethyl α-ethoxyacrylate, isocyanatoethyl (meth)acrylate, cyanoacrylate, m-isopropenyl-α,α-dimethylmethylbenzyl isocyanate, and the like.

Among them, in terms of the compatibility with urethane resins, (j) alkyl (meth)acrylate and (a3) aromatic vinyl type hydrocarbons are preferable and methyl acrylate, methyl methacrylate, and styrene are more preferable.

These monomers may be used alone or two or more of them may be used in combination.

Examples of the monomer (a02) having two or more vinyl groups (tetra- or higher functional vinyl monomer) and copolymerizable with the above-mentioned monomer (a01) having one vinyl group (the above-mentioned vinyl monomer) may include as follows:

(a) vinyl type hydrocarbons (a1) aliphatic vinyl type hydrocarbons: butadiene, isoprene, 1,4-pentadiene, 1,6-hexadiene, 1,7-octadiene, and the like;

(a2) alicyclic vinyl type hydrocarbons: (di)cyclopentadiene, limonene, indene, vinylcyclohexene, ethylenebicycloheptene, and the like; and (a3) aromatic vinyl type hydrocarbons: divinylbenzene, divinyltoluene, divinylxylene, divinyl ketone, trivinylbenzene, and the like;

(b) nitrogen-containing vinyl type monomers

N,N'-methylene-bis(meth)acrylamide, diallylamine, quaternarized compounds (quaternarized by using quaternarization agents such as methylchloride, dimethylsulfuric acid, benzyl chloride, and dimethyl carbonate) of diallylamine, and the like;

(c) vinyl esters, vinyl ethers, and vinyl ketones diallyl phthalate, diallyl adipate, diallyl maleate, vinyl methacrylate, methoxybutadiene, divinyl sulfide, divinyl sulfone, divinyl sulfoxide, poly(meth)acryloxyalkanes (e.g. diallyloxyethane, triallyloxyethane, tetraallyloxyethane, tetraallyloxypropane, tetraallyloxybutane, tetramethallyloxyethane), and the like;

(d) poly(meth)acrylates of polyhydric alcohols ethylene glycol di(meth)acrylate, propylene glycol di(meth)acrylate, 1,3-butylene di(meth)acrylate, neopentyl glycol di(meth)acrylate, trimethylolpropane tri(meth)acrylate, polyethylene glycol di(meth)acrylate, and the like.

Among them, in terms of the compatibility with urethane resins, (d) poly(meth)acrylates of polyhydric alcohols are preferable and ethylene glycol di(meth)acrylate is more preferable.

These monomers may be used alone or two or more of them may be used in combination.

A combination of the above-mentioned (a01) and the above-mentioned (a02) is preferably a combination of an alkyl (meth)acrylate and a poly(meth)acrylate of a polyhydric alcohol.

The weight ratio (%) of the above-mentioned (a02) in the total weight of the monomer (a01) having one vinyl group (a bifunctional vinyl type monomer) and monomer (a02) having two or more vinyl groups (a tetra- or higher functional vinyl type monomer) is, in terms of stain-proofness of a mold, preferably 1% or higher, more preferably 2% or higher, furthermore preferably 3% or higher, and even more preferably 4% or higher and in terms of melting property, preferably 30% or lower, more preferably 20% or lower, furthermore preferably 15% or lower, and even more preferably 10% or lower.

Hereinafter, the second invention will be described.

A resin (e0) of a fine particle powder (E) of a vinyl type copolymer having a cross-linked structure comprises the above-mentioned monomer (a01) having one vinyl group and a monomer (a03), which is capable of copolymerizing with the (a01), having one or more vinyl groups and one or more functional groups other than a vinyl group and, if necessary, a crosslinking agent component (a04).

In the invention, the monomer (a03) having one or more vinyl groups and one or more functional groups other than a vinyl group is a monomer having one or more carbon-carbon double bonds in a molecule and one or more functional groups other than vinyl group.

A functional group other than vinyl group may include, for example, functional groups having active hydrogen (e.g. hydroxyl, carboxyl, amino, amido, and mercapto) and functional groups having no active hydrogen (e.g. epoxy).

Specific examples of the monomer (a03) having one or more vinyl groups and one or more functional groups other than a vinyl group may include as follows:

(1) hydroxyl-containing vinyl type monomers the monomers exemplified above for the hydroxyl-containing vinyl type monomers (e);

(2) carboxyl-containing vinyl type monomers and their salts the monomers exemplified above for the carboxyl-containing vinyl type monomers (b) and their salts;

(3) amino group-containing vinyl type monomers aminoethyl (meth)acrylate, N-aminoethyl (meth)acrylamide, (meth)allylamine, crotylamine, aminostyrene, vinylimidazole, N-arylphenylenediamine, aminocarbazole, aminothiazole, aminoindole, aminopyrrole, aminoimidazole, aminomercaptothiazole and their salts;

(4) amido group-containing vinyl type monomers (meth)acrylamide, N-methyl(meth)acrylamide, N-butylacrylamide, diacetoneacrylamide, N-methylol (meth)acrylamide, cinnamic acid amide, and methacrylformamide; and (5) epoxy-containing vinyl type monomers the monomers exemplified above for the epoxy-containing vinyl type monomers.

Among them, in terms of the compatibility with urethane resins, hydroxyl-containing vinyl type monomers, carboxyl-containing vinyl type monomers, and amino group-containing vinyl type monomers are preferable and hydroxyethyl (meth)acrylate and (meth)acrylic acid are more preferable. These monomers may be used alone or two or more of them may be used in combination.

The crosslinking agent component (a04) is not particularly limited if it is a compound having two or more groups having reactivity on active hydrogen and examples may include an organic polyisocyanate (a041), a polyethoxide (a042), and a polycarboxylic acid (a043). Among them is the organic polyisocyanate (a041) preferable.

The above-mentioned organic polyisocyanate (a041) may be those which have been used conventionally for polyurethane production. The organic polyisocyanate (a041) may include aliphatic polyisocyanates having 2 to 18 carbon atoms (excluding the carbon of NCO group, hereinafter the same), alicyclic polyisocyanates having 4 to 15 carbon atoms, aromatic aliphatic polyisocyanates having 8 to 15 carbon atoms, aromatic polyisocyanates having 6 to 20 carbon atoms which all have 2 to 5 (preferably 2) isocyanato groups (NCO group), and modified compounds of these polyisocyanates (carbodiimido-modified compounds, urethane modified compounds, urethodione-modified compounds, and isocyanurate-modified compounds) and also mixtures of two or more kinds of these compounds.

Examples of the aliphatic polyisocyanates having 2 to 18 carbon atoms are diisocyanates such as ethylene diisocyanate, tetramethylene diisocyanate, hexamethylene diisocyanate (HDI), dodecamethylene diisocyanate, 2,2,4-trimethylhexanediisocyanate, lysine diisocyanate, 2,6-diisocyanatomethyl caproate, bis(2-isocyanatoethyl) fumarate, bis(2-isocyanatoethyl) carbonate and 2-isocyanatoethyl-2,6-diisocyanatohexanoate; triisocyanates such as 1,6,11-undecanetriisocyanate.

Examples of the alicyclic polyisocyanates having 4 to 15 carbon atoms are isophorone diisocyanate (IPDI), dicyclohexylmethane-4,4'-diisocyanate (hydrogenated MDI), cyclohexylene diisocyanate, methylcyclohexylene diisocyanate, bis(2-isocyanatoethyl)-4-cyclohexylene-1,2-dicarboxylate, and 2,5- or 2,6-norbornane diisocyanate.

Examples of the aromatic aliphatic polyisocyanates having 8 to 15 carbon atoms are m- and/or p-xylylene diisocyanate, diethylbenzene diisocyanate, and α, α, α', α'-tetramethylxylylene diisocyanate.

Examples of the aromatic polyisocyanates having 6 to 20 carbon atoms are diisocyanates such as 1,3- and/or 1,4-phenylene diisocyanate, 2,4- and/or 2,6-tolylene diisocyanate (TDI), 4,4'- and/or 2,4'-diphenylmethane diisocyanate (MDI), 4,4'-diisocyanatobiphenyl, 3,3'-dimethyl-4,4'-diisocyanatobiphenyl, 3,3'-dimethyl-4,4'-diisocyanatodiphenylmethane, and 1,5-naphthylene diisocyanate; and tri or higher functional polyisocyanates (e.g. triisocyanates) such as polyphenylmethane polyisocyanates (crude MDI).

Among them are organic diisocyanates preferable. In terms of light resistance, non-aromatic (aliphatic, alicyclic, and aromatic aliphatic) polyisocyanates are preferable and aliphatic diisocyanates, alicyclic diisocyanates and their combination use are particularly preferable. Hexamethylene diisocyanate, hydrogenated MDI, and isophorone diisocyanate are even more preferable.

The above-mentioned polyepoxide (a042) may be aliphatic, alicyclic, heterocyclic, or aromatic.

An aromatic polyepoxide may include glycidyl ethers of polyphenols and examples are bisphenol F diglycidyl ether, bisphenol A diglycidyl ether, bisphenol B diglycidyl ether, bisphenol AD diglycidyl ether, bisphenol S diglycidyl ether, bisphenol A diglycidyl halide, tetrachlorobisphenol A diglycidyl ether, catechin diglycidyl ether, resorcinol diglycidyl ether, hydroquinone diglycidyl ether, pyrogallol triglycidyl ether, 1,5-dihydroxynaphthaline diglycidyl ether, dihydroxybiphenyl diglycidyl ether, octachloro-4,4'-dihydroxybiphenyl diglycidyl ether, phenol or cresol novolak resin diglycidyl ether compounds, diglycidyl ether compounds obtained by reaction of two mole of bisphenol A and three mole of epichlorohydrin, polyglycidyl ether compounds of polyphenols obtained by condensation reaction of phenol with glyoxal, glutaraldehyde, or formaldehyde, and polyglycidyl ether compounds of polyphenols obtained by condensation reaction of resorcin and acetone.

Further, in the invention, the above-mentioned aromatic polyepoxide may include diglycidylurethane compounds obtained by addition reaction of tolylene diisocyanate or diphenylmethane diisocyanate with glycidol, glycidyl-containing polyurethane (pre)polymer obtained by reaction of the above-mentioned two kind reaction products with polyols, and diglycidyl ether compounds of bisphenol A alkylene oxide (ethylene oxide or propylene oxide) adducts.

A heterocyclic polyepoxide may be trisglycidylmelamine.

An alicyclic polyepoxide may include, for example, vinylcyclohexene dioxide, limonene dioxide, dicyclopentadiene dioxide, bis(2,3-epoxycyclopentyl)ether, ethylene glycol bisepoxydicyclopentyl ether, 3,4-epoxy-6-methylcyclohexylmethyl-3',4'-epoxy-6'-methylcyc lohexane carboxylate, bis (3,4-epoxy-6-methylcyclohexylmethyl) adipate, and bis(3,4-epoxy-6-methylcyclohexylmethyl)butylamine. An alicyclic polyepoxide may include those obtained by nucleophilic hydrogenation of the above-mentioned aromatic polyepoxides.

An aliphatic polyepoxide may include aliphatic polyhydric alcohol polyglycidyl ether compounds, aliphatic polycarboxylic acid polyglycidyl ester compounds, and glycidyl aliphatic amines.

An aliphatic polyhydric alcohol polyglycidyl ether compound may include, for example, ethylene glycol diglycidyl ether, propylene glycol diglycidyl ether, tetramethylene glycol diglycidyl ether, polyethylene glycol diglycidyl ether, polypropylene glycol diglycidyl ether, trimethylolpropane triglycidyl ether, pentaerythritol tetraglycidyl ether, and sorbitol polyglycidyl ether.

An aliphatic polycarboxylic acid polyglycidyl ester compound may include, for example, diglycidyl adipate.

A glycidyl aliphatic amine may include, for example, N,N,N',N'-tetraglycidylhexamethylenediamine.

In the invention, aliphatic compounds may include glycidyl (meth)acrylate (co)polymers.

Preferable examples among them are aliphatic and alicyclic polyepoxides.

A polycarboxylic acid (043) to be used in the invention may be those which have been used conventionally for polyester resin synthesis and examples are aliphatic dicarboxylic acids having 4 to 15 carbon atoms (e.g. succinic acid, adipic acid, sebacic acid, glutaric acid, azelaic acid, maleic acid, and fumaric acid), aromatic dicarboxylic acids having 8 to 12 carbon atoms (e.g. terephthalic acid and isophthalic acid), tricarboxylic acids, (e.g. trimellitic acid), ester-formable derivatives of them (e.g. acid anhydrides, lower alkyl esters (e.g. dimethyl esters and diethyl esters), and mixtures of two or more of them.

Preferable examples among them are aliphatic dicarboxylic acids.

A combination of the above-mentioned (a01), (a03) and (a04) is preferably a combination of an alkyl (meth)acrylate, a hydroxyl-containing vinyl type monomer, and an organic polyisocyanate and a combination of methyl (meth)acrylate, hydroxyethyl (meth)acrylate, and hexamethylene diisocyanate is particularly preferable.

In terms of the compatibility with urethane resins, the weight ratio (%) of the above-mentioned monomer (a01) having one vinyl group, the above-mentioned monomer (a03) having one or more vinyl groups and one or more functional groups other than a vinyl group, and the above-mentioned crosslinking agent component (a04) is preferably (50 to 98):(2 to 50):(0 to 5) and more preferably (65 to 95):(4 to 35):(0.1 to 2).

Hereinafter, the common items of the first invention and the second invention will be described.

The fine particle powder (A) of a vinyl type copolymer having a cross-linked structure or the fine particle powder (E) of a vinyl type copolymer having a cross-linked structure may be each one kind powder alone or a mixture of two kinds of powders.

From a viewpoint of the fluidity (powder flow-ability) of the resin powder composition and the blocking, the mixing ratio of (A) or (E) is preferably 0.1% by weight or higher and more preferably 0.6% by weight and from a viewpoint of the stain-proofness of a mold, it is preferably 5% by weight or less and more preferably 1.5% by weight or less to the thermoplastic polyurethane resin powder (B).

From a viewpoint of the fluidity (powder flow-ability) of the resin powder composition, the volume average particle diameter of the above-mentioned (A) or (E) is preferably 0.1 .mu.m or larger and more preferably 0.5 μm or larger and preferably 100 .mu.m or smaller and more preferably 50 μm or smaller.

The shape of the above-mentioned (A) or (E) is not particularly limited, however it is preferably spherical or close to be spherical from a viewpoint of the flow-ability of the material at the time of molding.

The melt index of the (A) or (E) at a temperature of 200° C. and a load of 21.6 kg is preferably 10 or lower and more preferably 5 or lower, from a viewpoint of the heat resistance and the blocking property. The melt index is measured by, for example, Melt Indexer manufactured by Tester Sangyo Co., Ltd. The Melt Indexer is an extrusion type plastometer operable in a constant action manner and satisfies the regulation of JIS K7210-1976 "Test Method of Flow of Thermoplastics" or ASTM D1238-82 "FLOW RATES OF THERMOSPLASTICS BY EXTRUSION PLASTOMETER".

Examples of a production method of the above-mentioned (A) may be as follows:
(1) a method of obtaining a fine powder of a copolymer of a monomer (a01) having one vinyl group and a monomer (a02) having two or more vinyl groups by suspension polymerization; and
(2) a method of obtaining the above-mentioned (A) by pulverization after a resin (a0) of the above-mentioned (A) is obtained by bulk polymerization.

The method (1) is more preferable between the methods.

Examples of a production method of a resin (e0) of the above-mentioned fine particle powder (E) of a vinyl type copolymer having a cross-linked structure may be as following two methods:
(1) a method of obtaining the above-mentioned (e0) by at first carrying out reaction of active hydrogen of a monomer (a03) having one or more vinyl groups and one or more functional groups other than a vinyl group and a crosslinking agent component (a04) and then adding the monomer (a01) having one vinyl group and carrying out polymerization; and
(2) a method of obtaining the above-mentioned (e0) by at first obtaining a copolymer of the above-mentioned (a01) and (a03) and then, if necessary, adding the above-mentioned (a04) to the obtained copolymer and carrying out crosslinking reaction.

The method (1) is more preferable between the methods.

The reaction temperature of the active hydrogen in the above-mentioned (a03) and the crosslinking agent component (a04) and the reaction temperature of the active hydrogen in the polymer consisting of the above-mentioned (a01) and (a03) and, if necessary, (a04) and the above-mentioned (a04) are preferably 50 to 130° C. and more preferably 80 to 110° C.

In the above-mentioned production method, a solvent and a catalyst may be used if needed. Practical examples of the solvent may include ketone type solvents (e.g. MEK, MIBK and the like), ester type solvents (e.g. methyl acetate, ethyl acetate, butyl acetate, and the like), aromatic type solvents (e.g. toluene, xylene, and the like), nitrile type solvents (e.g. acetonitrile, and the like), ether type solvents (e.g. tetrahydrofuran, petroleum ether, diethyl ether and the like), and other solvents (e.g. DMF, and the like).

The reaction of the above-mentioned (a01), (a03) and, if necessary, the above-mentioned (a04) is preferably carried out at a temperature of 30 to 120° C. and more preferably 40 to 90° C. If needed, a solvent, a polymerization initiator, and a chain transfer agent may be used. The above exemplified solvents may be used as the solvent. Conventionally known initiator may be used as the polymerization initiator and examples are azo compounds and peroxides. Conventionally known compounds such as lauryl mercaptan may be used as the chain transfer agent.

Examples of a production method of the above-mentioned fine particle powder (E) of a vinyl type copolymer comprising the vinyl type copolymer resin (e0) having a cross-linked structure may be as follows:
(1) a method of obtaining a fine particle powder of the above-mentioned (e0) by suspension polymerization of a reaction product of active hydrogen of a monomer (a03) having one or more vinyl groups and one or more functional groups other than a vinyl group and a crosslinking agent component (a04) with a monomer (a01) having one vinyl group;
(2) a method of obtaining a polymer of a fine particle powder by suspension polymerization of the above-mentioned (a01) and the above-mentioned (a03) and successively obtaining the fine particle powder (E) by adding the above-mentioned (a04), if necessary, to the polymer and then carrying out crosslinking reaction; and
(3) a method of obtaining the fine particle powder (E) by obtaining the above-mentioned (e0) by bulk polymerization and then pulverizing the (e0).

The methods (1) and (2) are preferable among the above-mentioned methods.

As a powder flowability improver, a fine powder (A') different from the above-mentioned (A) may be used in combination with the above-mentioned (A). Further, the above-mentioned (A') may be used in combination with the above-mentioned (E). The above-mentioned (A') may be a fine powder having a volume average particle diameter of 0.1 to 100 µm and may include inorganic fine powders such as a silica fine powder (volume average particle diameter 0.1 to 20 µm), a calcium type fine powder of such as calcium carbonate and calcium sulfate, a barium type fine powder of such as barium carbonate and barium sulfate, a magnesium type fine powder of such as magnesium silicate and magnesium oxide, and a mineral type fine powders such as talc and clay; organic fine powders such as a cellulose type fine powder, a polyester type fine powder, a polyamide type fine powder, a non-cross-linked type polyvinyl alcohol type fine powder, a non-cross-linked type olefin type fine powder, and a non-cross-linked type acrylic fine powder. Among them, in terms of the storage stability, inorganic type fine powders are preferable and a silica fine powder is more preferable. The above-mentioned (A') may be used in an amount of preferably 0 to 100% by weight and more preferably 10 to 70% by weight to the weight of the above-mentioned (A) or (E).

The thermoplastic polyurethane resin powder (B) to be used in the invention is a polyurethane powder having a volume average particle diameter preferably in a range from 10 to 500 µm and more preferably in a range from 70 to 300 µm and capable of melting at 200 to 300° C.

Examples of a production method of the above-mentioned (B) may be following methods:
(1) a method of carrying out reaction of an isocyanato group-terminated urethane prepolymer and a blocked chain expanding agent (e.g. a ketimine compound) in the presence of water and a dispersion stabilizer; for example, a method described in JP-A No. 8-120041 may be employed;
(2) a method of carrying out reaction of a urethane prepolymer having a composition of urethane bonds and urea bonds and a chain expanding agent (e.g. a diamine and/or a glycol) in the presence of an organic solvent in which the urethane prepolymer is not dissolved and a dispersion stabilizer; for example, a method described in JP-A No. 4-202331 may be employed; and
(3) a method of obtaining a bulky substance of thermoplastic polyurethane resin by reaction of a diisocyanate, a high molecular weight glycol, and, if necessary, a chain expanding agent (e.g. a low molecular weight glycol and a low molecular weight diamine) and then powering the substance (e.g. freeze grinding and a method of cutting the substance by passing fine holes in melted state).

Further, if needed, the resin powder composition for slush molding of the invention may contain an additive (D) to the extent that blocking can be prevented without staining the mold, which is the particular effect of the invention, besides the above-mentioned components (A), (B), and (E). The above-mentioned (D) may include conventionally known and used pigments, inorganic fillers, plasticizers, releasing agents, organic fillers, dispersants, UV absorbents (photostabilizers), and antioxidants. The total of the addition amount of the above-mentioned (D) is preferably in a range from 0 to 60% by weight and more preferably in a range from 10 to 50% by weight to the weight of the thermoplastic polyurethane resin powder (B).

Examples of a method for mixing the resin powder composition for slush molding of the invention may be as follows:
(1) a method of dry blending a thermoplastic polyurethane resin powder (B), a fine particle powder (A) of a vinyl type copolymer having a cross-linked structure, and if necessary, an additive (D);
(2) a method involving producing a thermoplastic polyurethane resin powder (B) in the presence of the additive (D) added if needed and dry blending a fine particle powder (A) of a vinyl type copolymer having a cross-linked structure; and
(3) a method involving producing a thermoplastic polyurethane resin powder (B) in the presence of a pigment if needed and dry blending the obtained (B), the above-mentioned (A), and an additive (D) added if needed, other than pigments.

The method (1) is preferable among them.

With respect to the fine particle powder (E) of a vinyl type copolymer having a cross-linked structure, a resin powder composition for slush molding can be obtained in the same methods as those of the case of the above-mentioned (A). The methods (1) and (2) are preferable among them.

Conventionally known powder mixing apparatus may be used as a mixing apparatus to be used for the mixing and a container rotation type mixing apparatus, a fixed container type mixing apparatus, and a fluid moving type mixing apparatus are all usable. For example, in the case of a fixed container type mixing apparatus, methods for dry blending using a high speed fluidizing type mixing apparatus, a multi-axial paddle type mixing apparatus, a high speed shearing mixing apparatus (a Henschel mixer), a low speed mixing apparatus (a planetary mixer), and a conical type screw mixer (a Nauta mixer (Registered trademark)) have been known well. Among these methods, it is preferable to use a multi-axial paddle type mixing apparatus, a low speed mixing apparatus (a planetary mixer), and a conical type screw mixer (a Nauta mixer (Registered trademark)).

To mold the resin powder composition for slush molding of the invention by a slush molding method, the method is preferable to be carried out, for example, vibrating and rotating a box filled with the powder composition of the invention and a heated mold for melting and fluidizing the powder in the mold and successively solidifying the powder by cooling for forming the skin. The above-mentioned mold temperature is preferably in a range from 200 to 300° C. and more preferably 210 to 280° C. The fine particle powder (A) or (E) of a vinyl type copolymer having a cross-linked structure is not melted in this temperature range.

The thickness of the skin formed by molding the molding material of the invention is preferably 0.5 to 1.5 mm. The skin is preferably usable for an automotive interior material such as the skin of an instrument panel and a door trim. The molded skin is preferable to be set in a manner that the skin surface is brought into contact with a foaming mold and then a urethane foam is introduced to form a foamed layer in 5 to 15 mm thickness in the rear face side of the skin.

EXAMPLES

Hereinafter, the invention will be described more in detail with reference to Production Examples and Practical Examples, however it is not intended that the invention be limited to the illustrated Examples.

Unless otherwise specified, the term "part(s)" in Examples means part(s) by weight.

<Measurement Method of Melt Index>

Measurement of the melt index of a fine particle powder (A) or (E) of a vinyl type copolymer having a cross-linked structure was carried out by a Melt Indexer manufactured by Tester Sangyo Co., Ltd. The measurement conditions were as described below.

test temperature: 200° C.
test load: 21.6 kg
test sample amount: 4 g

<Measurement Method of Volume Average Particle Diameter>

Measurement of the volume average particle diameter was carried out by Micro Track HRA 9320-X100, manufactured by Nikkiso Co., Ltd. The volume average particle diameter is an average value of measurement values of D50 measured two times.

Production Example 1

<Production of Colored Thermoplastic Polyurethane Resin Powder>(B-1)
Production of Prepolymers Solution Polybutylene adipate (575 parts) having a number average molecular weight (hereinafter, referred to as Mn) of 1000, Polyhexamethylene isophthalate (383 parts) having Mn of 900, and 1-octanol (16.8 parts) were loaded into a reaction container equipped with a thermometer, a stirrer, and a nitrogen inlet tube and after the inside gas was replaced with nitrogen, the contents were heated to 110° C. while being stirred to melt them and then cooled to 60° C. Successively, hexamethylene diisocyanate (242 parts) was added and reaction was carried out at 85° C. for 6 hours. Next, the reaction product was cooled to 60° C. and tetrahydrofuran (217 parts), a stabilizer (2.5 parts) (Irganox 1010, manufactured by Ciba Specialty Chemicals Inc.) and titanium oxide (15.3 parts) (Tipaque R-820, manufactured by Ishihara Sangyo Kaisha, Ltd.) were added and evenly mixed to obtain a prepolymers solution. The NCO content of the obtained prepolymer solution was 2.2%.

Production of MEK Ketimine Compound of Diamine

While produced water being removed outside, hexamethylenediamine and an excess amount of MEK (methyl ethyl ketone, 4 times as much by mole to the amount of the diamine) were refluxed at 80° C. for 24 hours. After that, unreacted MEK was removed in reduced pressure to obtain MEK ketimine compound.

Production of Thermoplastic Polyurethane Resin Powder

The prepolymer solution (100 parts) and the MEK ketimine compound (5.6 parts) obtained in the above described manner were loaded into a reaction container and an aqueous solution 340 part containing a dissolved dispersant (Sansparl PS-8 (1.3 part), manufactured by Sanyo Chemical Industries, Ltd.) was added and mixed by Ultra Disperser manufactured by Yamato Kagaku Co., Ltd. at a rotation speed of 9000 rpm for 1 minute. The resulting mixture was transferred to a reaction container equipped with a thermometer, a stirrer, and a nitrogen inlet tube and after the inside gas was replaced with nitrogen, the mixture was reacted at 50° C. for 10 hours under stirring condition. On completion of the reaction, the reaction product was filtered and dried to obtain a thermoplastic urethane resin powder (B-1). The Mn and volume average particle diameter of the obtained (B-1) were 25,000 and 151 µm, respectively.

Production Example 2

<Production of Vinyl Type Copolymer Fine Particle Powder (E-1)>

Three hundred parts of an aqueous solution of 0.5% by weight of polyvinyl alcohol (saponification value 88%) was loaded into a four-neck flask equipped with a thermometer, a stirrer, and a Dimroth condenser. Next, methyl methacrylate (90 parts) and 2-hydroxyethyl methacrylate (10 parts) were added to methyl ethyl ketone (20 parts). Successively, while the inside gas of a reactor was replaced with nitrogen gas, polymerization was carried out at 65° C. for 4 hours in stirring condition and after the polymerization reaction system was cooled to a room temperature, the produced polymer was added to methanol to precipitate the polymer. The polymer was separated by filtration and vacuum dried to obtain a white powder (E-1-0). Fifty parts of the powder was loaded into a planetary mixer and successively, hexamethylene diisocyanate (0.3 parts) was added and reacted at 80° C. for 5 hours to obtain a fine particle powder (E-1). The average particle diameter and the number average molecular weight of the fine particle powder were 4 µm and 7000, respectively.

Production Example 3

<Production of Vinyl Type Copolymer Fine Particle Powder (E-2)>

2-Hydroxyethyl acrylate (10 parts), hexamethylene diisocyanate (0.5 parts), and methyl ethyl ketone (20 parts) were loaded into a four-neck flask equipped with a thermometer, a stirrer, and a Dimroth condenser and reaction was carried out at 80° C. for 5 hours in stirring condition to obtain a reaction product (E-2-0). An aqueous solution (300 parts) of 0.5% by weight of polyvinyl alcohol (saponification value 88%) was loaded into another four-neck flask equipped with a thermometer, a stirrer, and a Dimroth condenser. Next, methyl methacrylate (90 parts) and the reaction product (E-2-0) (30 parts) were loaded. Successively, while the inside gas of the reactor was replaced with nitrogen gas, polymerization was carried out at 65° C. for 4 hours in stirring condition and after the polymerization reaction system was cooled to a room temperature, the produced polymer was added to methanol to precipitate the polymer. The polymer was separated by filtration and vacuum dried to obtain a fine particle powder (E-2). The average particle diameter and the number average molecular weight of the fine particle powder (E-2) were 5 μm and 10,000, respectively.

Production Example 4

<Production of Vinyl Type Copolymer Fine Particle Powder (E-3)>

Fifty parts of the white powder (E-1-0) obtained in the same manner as the production method of the above-mentioned (E-1) of the Production Example 2 was loaded into a planetary mixer and successively, 0.15 parts of hexamethylene diisocyanate and 0.15 parts of isophorone diisocyanate were added and reacted at 80° C. for 5 hours to obtain a fine particle powder (E-3). The average particle diameter and the number average molecular weight of the fine particle powder were 3 μm and 8000, respectively.

Example 1

A hundred parts of the above-mentioned (B-1) and 20 parts of polyethylene glycol dibenzoic acid ester (Sanfix EB 300, manufactured by Sanyo Chemical Industries, Ltd.) were loaded into a 100 L-capacity Nauta mixer and mixed at 70° C. for 3 hours. Next, 0.1 parts of modified dimethyl polysiloxane (KF 96, manufactured by Shin-Etsu Chemical Co., Ltd.) was added and mixed for 1 hour and the resulting mixture was cooled to a room temperature. After cooling, 1 part of methyl methacrylate-ethylene glycol dimethacrylate copolymer fine particle powder (copolymerization ratio 95:5 (by weight), volume average particle diameter 20 μm, Ganz Pearl PM-030, manufactured by GANZ CHEMICAL CO., LTD.) (A-1) was added and mixed to obtain a resin powder composition (S0) for slush molding. The melt index of the above-mentioned (A-1) was 0. The average particle diameter of the above-mentioned (S1) was 152 μm.

Example 2

A resin powder composition (S2) for slush molding was obtained in the same manner as Example 1, except that a mixture of Ganz Pearl PM-030 (0.3 parts) and 0.2 parts of a silica powder (Syloblock S 200, volume average particle diameter 2 μm, manufactured by Fuji-Devison Chemical Ltd.) was used in place of 1 part of the copolymer fine particle powder (A-1) of Example 1. The volume average particle diameter of the (S2) was 140 μm.

Example 3

A resin powder composition (S3) for slush molding was obtained in the same manner as Example 1, except that 1 part of methyl methacrylate-ethylene glycol dimethacrylate copolymer fine particle powder (A-2) (copolymerization ratio 90:10 (by weight), volume average particle diameter 19 μm) was used in place of 1 part of the copolymer fine particle powder (A-1) of Example 1. The melt index of the (A-2) at a temperature of 200° C. and a load of 21.6 kg was 0. The volume average particle diameter of the (S3) was 152 μm.

Example 4

A resin powder composition (S4) for slush molding was obtained in the same manner as Example 1, except that 1 part of a cross-linked styrene-acrylic copolymer fine particle powder (A-3) (Micro Gel MG-251, volume average particle diameter 2 μm, manufactured by Nippon Paint Co., Ltd.) was used in place of 1 part of the copolymer fine particle powder (A-1) of Example 1. The volume average particle diameter of the (S4) was 150 μm.

Example 5

A resin powder composition (S5) for slush molding was obtained in the same manner as Example 1, except that 1 part of the fine particle powder (E-1) was used in place of 1 part of the copolymer fine particle powder (A-1) of Example 1. The volume average particle diameter of the (S5) was 151 μm.

Example 6

A resin powder composition (S6) for slush molding was obtained in the same manner as Example 1, except that 1 part of the fine particle powder (E-2) was used in place of 1 part of the copolymer fine particle powder (A-1) of Example 1. The volume average particle diameter of the (S6) was 151 μm.

Example 7

A resin powder composition (S7) for slush molding was obtained in the same manner as Example 1, except that 1 part of the fine particle powder (E-3) was used in place of 1 part of the copolymer fine particle powder (A-1) of Example 1. The volume average particle diameter of the (S7) was 150 μm.

Comparative Example 1

A resin powder composition (S1') for slush molding was obtained in the same manner as Example 1, except that 1 part of a urethane resin powder (A-1') (volume average particle diameter 5 μm, melting point 230° C.) was used in place of 1 part of the copolymer fine particle powder (A-1) of Example 1. The volume average particle diameter of the (S1') was 152 μm.

Comparative Example 2

A resin powder composition (S2') for slush molding was obtained in the same manner as Example 1, except that 1 part of a N-cyclohexylmaleimide polymer powder (A-2') (NoflexMP-200, manufactured by Nippon Oil & Fats Co., Ltd.) was used in place of 1 part of the copolymer fine particle powder (A-1) of Example 1. The volume average particle diameter of the (S2') was 153 μm.

Comparative Example 3

A resin powder composition (S3') for slush molding was obtained in the same manner as Example 1, except that 1 part of a styrene resin powder (A-3') (average particle diameter 1 μm, melting point 200° C.) was used in place of 1 part of the copolymer fine particle powder (A-1) of Example 1. The volume average particle diameter of the (S3') was 152 μm.

Comparative Example 4

A resin powder composition (S4') for slush molding was obtained in the same manner as Example 1, except that 1 part of a non-cross-linked methyl methacrylate polymer fine particle powder (A-4') (volume average particle diameter 15 μm) was used in place of 1 part of the copolymer fine particle powder (A-1) of Example 1. The volume average particle diameter of the (S4') was 153 μm.

Comparative Example 5

A resin powder composition (S5') for slush molding was obtained in the same manner as Example 1, except that 1 part of a polyamide resin fine particle powder (A-5') (volume average particle diameter 3 μm) was used in place of 1 part of the copolymer fine particle powder (A-1) of Example 1. The volume average particle diameter of the (S5') was 152 μm.

Comparative Example 6

A resin powder composition (S6') for slush molding was obtained in the same manner as Example 1, except that 1 part of a silicon resin fine particle powder (A-6') (volume average particle diameter 5 μm) was used in place of 1 part of the copolymer fine particle powder (A-1) of Example 1. The volume average particle diameter of the (S6') was 153 μm.

Comparative Example 7

A resin powder composition (S7') for slush molding was obtained in the same manner as Example 1, except that 1 part of a polyolefin resin fine particle powder (A-7') (volume average particle diameter 3 μm, melting point 105° C.) was used in place of 1 part of the copolymer fine particle powder (A-1) of Example 1. The volume average particle diameter of the (S7') was 153 μm.

Comparative Example 8

A resin powder composition (S8') for slush molding was obtained in the same manner as Example 1, except that 1 part of an epoxy resin fine particle powder (A-8') (volume average particle diameter 1 μm) was used in place of 1 part of the copolymer fine particle powder (A-1) of Example 1. The volume average particle diameter of the (S8') was 153 μm.

Comparative Example 9

A hundred parts of a hydrogenated block copolymer (trade name: Dynaron 1320P, manufactured by JSR Co., Ltd.), 100 parts of an aromatic monomer copolymer (trade name: Endex 155, manufactured by EASTMAN CHEMICAL), 50 parts of a polyethylene wax (trade name: A-C 753, manufactured Allied Signal Co., Ltd.), and 0.5 parts of an antioxidant (trade name: HP2215, manufactured by Ciba Specialty Chemicals Inc.) were kneaded by a biaxial extruder and 0.25 parts of Perhexa 25B (manufactured by Nippon Oil & Fats Co., Ltd.) and 0.75 parts of NK Ester (an ester type crosslinking agent, manufactured by Shin-Nakamura Chemical Co., Ltd.) were added to carry out dynamic crosslinking treatment. The obtained pellets were frozen and pulverized to obtain a thermoplastic elastomer composition powder. A hundred parts of the obtained powder and 1 part of the copolymer fine particle powder (A-1) obtained in Example 1 were dry-blended by a Henschel mixer to obtain a resin powder composition (S9') for slush molding. The volume average particle diameter of the (S9') was 160 μm.

Comparative Example 10

A hundred parts of an acrylate type resin (volume average particle diameter 178 μm, butyl acrylate content 73%, gelling ratio 88%), 1.5 parts of a phenol type antioxidant, 0.5 parts of a UV absorbent, and 4 parts of an epoxy type plasticizer were loaded into a 100 L-capacity Nauta mixer and successively 25 parts of an adipic acid type polyester plasticizer with a viscosity of 2600 cps at 25° C. and mixed at 50° C. for 3 hours. After the mixture was cooled, 1 part of the copolymer fine particle powder (A-1) obtained in Example 1 was added and mixed to obtain a resin powder composition (S10') for slush molding. The volume average particle diameter of the (S10') was 180 μm.

The resin powder compositions (S1) to (S7) for slush molding of Examples 1 to 7 and resin powder compositions (S1') to (S10') for slush molding of Comparative Examples 1 to 10 were subjected to the measurements of the repose angle (powder flowability), blocking ratio (storage stability), skin surface gloss, mold staining property, and melting property and the results are shown in Table 1 and Table 2.

TABLE 1

|  | Example | | | | | | |
| --- | --- | --- | --- | --- | --- | --- | --- |
|  | 1 | 2 | 3 | 4 | 5 | 6 | 7 |
| Powder composition | S1 | S2 | S3 | S4 | S5 | S6 | S7 |
| Repose angle (°) | 33 | 30 | 32 | 33 | 32 | 30 | 31 |
| Storage stability (%) | 35 | 25 | 35 | 30 | 35 | 30 | 30 |
| Melting property | ○ | ○ | ○ | ○ | ○ | ○ | ○ |
| Skin surface gloss | 1.3 | 1.4 | 1.2 | 1.4 | 1.3 | 1.2 | 1.3 |
| Mold staining property | ○ | ○ | ○ | ○ | ○ | ○ | ○ |

TABLE 2

|  | Comparative Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Powder composition | S1' | S2' | S3' | S4' | S5' | S6' | S7' | S8' | S9' | S10' |
| Repose angle (°) | 38 | 33 | 32 | 33 | 38 | 32 | 37 | 40 | 46 | 36 |
| Storage stability (%) | 45 | 30 | 50 | 45 | 25 | 50 | 45 | 50 | 45 | 45 |
| Melting property | ○ | ○ | ○ | ○ | Δ | Δ | Δ | Δ | Δ | Δ |
| Skin surface gloss | 1.3 | 1.7 | 1.8 | 1.7 | 2.0 | 2.1 | 2.0 | 1.7 | 1.8 | 1.8 |
| Mold staining property | Δ | Δ | Δ | Δ | Δ | Δ | Δ | Δ | Δ | Δ |

<Evaluation Methods>

Repose Angle (Powder Flowability)

To evaluate the powder flowability of each resin powder composition for slush molding, the repose angle was measured by a powder tester (PT-R model, manufactured by Hosokawa Micron Co., Ltd.). The measurement was carried out in an air-conditioned room adjusted at a temperature of 23±0.5° C. and a humidity of 50±2%. As the repose angle is smaller, the powder flowability is better.

Blocking Ratio (Storage Stability)

At first, 50 g of each resin composition for slush molding was packed in a polyethylene bag and packed in a size of 10 cm×7 cm×about 1 cm by a heat sealer. The bag was sandwiched up and down between two contact steel plates with a size of 10 cm×10 cm and a weight of 1680 g was put on the bag. The bag in the state described above was put in a thermostat at 50° C. and left for 3 days. After that, the bag was opened and the powder was put on a sieve with 850 μm meshes, and lightly sieved and the weight of agglomerates left on the sieve was measured. The blocking ratio was calculated according to the following equation:

blocking ratio (%)=100×weight of the agglomerates (g)/50 g

Melting property, skin surface gloss, and mold staining property

Each resin powder composition for slush molding was packed in a Ni electro-molding mold having crape patterns previously heated to 270° C. and after 10 seconds, excess powder resin was discharged. After heating at 270° C. further for 90 seconds, water cooling was carried out to form the skin (thickness 1 mm).

(1) Melting Property

The state of the rear face of the obtained skin was observed with eyes.

(Evaluation Standard)
○: evenly melted and showing good gloss
Δ: partially un-melted powder existing, however showing gloss
×: no gloss in the rear face (2) Skin Surface Gloss (Luster)

The 60° surface gloss (luster) of the front face of the obtained skin was measured. As the value of the skin surface gloss is smaller, the quality of the molded skin is better.

(3) Mold Staining Property

The color alteration state of the Ni electro-molding mold surface was observed with eyes after repeating molding 100 times.

(Evaluation Standard)
○: no color change
Δ: color change
×: considerable color change

INDUSTRIAL APPLICABILITY

The skin formed by molding a resin powder composition for slush molding of the invention is preferably usable as the skin for automotive interior materials such as an instrument panel, a door trim, and the like.

The invention claimed is:

1. A powdered resin composition for slush molding comprising a thermoplastic polyurethane resin powder (B) as the main component and a fine particle powder (E) of a copolymer of methyl (meth)acrylate and hydroxyethyl (meth)acrylate and having a cross-linked structure formed by crosslinking a hydroxyl group with an organic polyisocyanate as a powder flowability improver, wherein the fine particle powder (E) is not melted in the temperature range of 200 to 300° C., the resin powder (B) has a volume average particle diameter in a range from 70 to 300 μm and is capable of melting at 200 to 300° C., and the thermoplastic polyurethane resin powder (B) and the fine particle powder (E) are polymerized and then dry-blended at room temperature to form a mixture, wherein the fine particle powder (E) is contained in an amount from 0.1% by weight to 1.5% by weight to the thermoplastic polyurethane resin powder (B).

2. The powdered resin composition according to claim 1 further containing a silica fine powder.

3. The powdered resin composition according to claim 1, wherein the fine particle powder (E) has a volume average particle diameter in a range from 0.1 μm to 100 μm.

4. The powdered resin composition according to claim 1 being obtained by dry-blending the thermoplastic polyurethane resin powder (B) with the fine particle powder (E) together with an additive (D) to be added.

5. A urethane resin molded product produced from the powdered resin composition for slush molding according to claim 1.

6. The powdered resin composition according to claim 3, wherein the fine particle powder (E) has a volume average particle diameter in a range from 3 μm to 5 μm.

* * * * *